US012784505B1

(12) United States Patent
Hwang

(10) Patent No.: US 12,784,505 B1
(45) Date of Patent: Nov. 3, 2026

(54) GESTURE RECOGNITION SYSTEM AND METHOD USING AI FUNCTION

(71) Applicant: SOULX Co., Ltd, Seoul (KR)

(72) Inventor: Young-Taeck Hwang, Goyang-si (KR)

(73) Assignee: SOULX Co., Ltd., Seoul (KR)

( * ) Notice: Subject to any disclaimer, the term of this patent is extended or adjusted under 35 U.S.C. 154(b) by 0 days.

(21) Appl. No.: 19/267,810

(22) Filed: Jul. 14, 2025

(30) Foreign Application Priority Data

May 20, 2025 (KR) ........................ 10-2025-0065328

(51) Int. Cl.

| | |
|---|---|
| ***G06F 3/01*** | (2006.01) |
| ***G06T 7/246*** | (2017.01) |
| ***G06T 7/73*** | (2017.01) |
| ***G06V 10/74*** | (2022.01) |
| ***G06V 40/12*** | (2022.01) |
| ***G06V 40/20*** | (2022.01) |

(52) U.S. Cl.

CPC .............. *G06V 40/28* (2022.01); *G06F 3/011* (2013.01); *G06F 3/017* (2013.01); *G06V 10/761* (2022.01); *G06V 40/1347* (2022.01)

(58) Field of Classification Search

CPC .. G06V 40/28; G06V 10/761; G06V 40/1347; G06F 3/011; G06F 3/017

See application file for complete search history.

(56) References Cited

U.S. PATENT DOCUMENTS 11,430,266 B1 * 8/2022 Yao ........................... G06T 7/20
2021/0089116 A1 * 3/2021 Erivantcev ................ G06T 7/20

* cited by examiner

*Primary Examiner* — Deeprose Subedi

(74) *Attorney, Agent, or Firm* — Blueshift IP; Robert Plotkin

(57) ABSTRACT

The present invention relates to a gesture recognition system and method using AI function, and more specifically, to a system and method for recognizing user gestures from images acquired from an image sensor and enabling specific functions to operate in XR content production solutions according to recognized gestures. A gesture recognition system according to an embodiment of the present invention includes an image sensor, memory, processor, and XR display unit, wherein the processor identifies a palm from an image acquired through the image sensor, determines recognition points for at least one finger based on the identified palm, identifies a gesture using the determined recognition points, converts the identified gesture into a data packet according to preset rules using OSC (Open Sound Control) protocol, transmits the converted data packet to the XR display unit, and the XR display unit outputs XR content using the received data packet.
The present invention is a technology developed through Seoul Economic Development Agency (2024. Creative Industry Technology Commercialization Support Project) (CC240045) (X-Room Multi-faceted Solution: Sustainable XR Content Production Solution for Multi-faceted Interactive Showcase).

8 Claims, 4 Drawing Sheets

0. WRIST
1. THUMB_CMC
2. THUMB_MCP
3. THUMB_IP
4. THUMB_TIP
5. INDEX_FINGER_MCP
6. INDEX_FINGER_PIP
7. INDEX_FINGER_DIP
8. INDEX_FINGER_TIP
9. MIDDLE_FINGER_MCP
10. MIDDLE_FINGER_PIP
11. MIDDLE_FINGER_DIP
12. MIDDLE_FINGER_TIP
13. RING_FINGER_MCP
14. RING_FINGER_PIP
15. RING_FINGER_DIP
16. RING_FINGER_TIP
17. PINKY_MCP
18. PINKY_PIP
19. PINKY_DIP
20. PINKY_TIP

GESTURE RECOGNITION SYSTEM AND METHOD USING AI FUNCTION

RESEARCH FUNDING ACKNOWLEDGEMENT

This invention was made with Government support under Project Identification Number PJT-26-020129, funded by the Ministry of Science and ICT (MSIT), and managed by the National IT Industry Promotion Agency (NIPA) as part of the Regional Digital Fundamental Capability Support Program (Regional SW Service Commercialization Support Project). The title of the research project is "AI XP Technology-Converged XROOM Vertical AI Agent Solution for IP Companies." The performing institutions of the research project are Jeju Techno Park and SOULX Co., Ltd., and the research period is from Jan. 1, 2026 to Dec. 31, 2027.

CROSS-REFERENCE TO RELATED APPLICATION AND CLAIM OF PRIORITY

This application claims the benefit under 35 U.S.C. § 119 (a) to Korean Application Serial No. 10-2025-0065328, which was filed in the Korean Intellectual Property Office on May 20, 2025, the entire disclosure of which is incorporated herein by reference for all purposes.

BACKGROUND

1. Technical Field

The present invention relates to a gesture recognition system and method using an AI function, and more specifically, to a system and method for recognizing user gestures by detecting points of palms and fingers from images acquired from an image sensor, and enabling specific functions to operate in an XR content production solution according to the recognized gestures.

2. Background Art

Recently, as XR (extended Reality) technology has developed and various devices have become widespread, the demand for XR content that amplifies user immersion is increasing. As a method to enhance immersion in virtual environments and provide natural interaction, gesture interfaces using users' hands are gaining attention. However, most existing XR content uses general controllers with button methods, which results in unnatural interaction between users and virtual environment objects and lacks intuitiveness.

To solve these problems, research on controlling content using user gestures is being actively conducted. For example, technology is being used that acquires images of user hand movements using a terminal camera unit, analyzes the acquired images to extract feature points, detects movement of the extracted feature points to recognize specific gestures, and then executes specific functions of the terminal using the recognized gestures.

In addition, existing research on hand gesture recognition has mostly focused on hand gesture interfaces using specialized equipment or sensors such as Kinect or Leap Motion. However, these methods have the disadvantage of requiring specialized equipment or sensors and being constrained by surrounding environments such as lighting or distance. Recently, research has been conducted to recognize hand gestures using deep learning technology, but this also has problems of requiring specific equipment or sensors or showing low recognition rates.

Meanwhile, in order to apply such gesture recognition technology to XR content production, a system that not only accurately recognizes various gestures but also enables specific functions of XR content to operate according to recognized gestures is needed. However, existing technologies do not sufficiently provide such functions.

Therefore, the present invention aims to provide a system and method that accurately recognizes user hand gestures using only RGB cameras without separate specialized sensors or equipment, and enables specific functions of XR content production solutions to operate according to recognized gestures.

The present invention is a technology developed through Seoul Economic Development Agency (2024 Creative Industry Technology Commercialization Support Project) (CC240045) (X-Room Multi-faceted Solution: Sustainable XR Content Production Solution for Multi-faceted Interactive Showcase).

SUMMARY

Various embodiments disclosed in this document aim to provide a gesture recognition system and method that recognizes user gestures by detecting points of palms and fingers from images acquired through an image sensor, and enables specific functions to operate in XR content production solutions according to recognized gestures.

Various embodiments disclosed in this document aim to provide an AI function that can accurately recognize user hand gestures using only RGB cameras without separate specialized sensors or equipment.

Various embodiments disclosed in this document aim to provide an interface that can be utilized in XR content production by distinguishing clearly recognizable finger shapes (VICTORY, Open, Close, Thumb up, etc.) among user gestures.

A gesture recognition system according to an embodiment of the present invention for solving the above problems includes an image sensor; memory; processor; and XR display unit, wherein the processor identifies a palm from an image acquired through the image sensor, determines recognition points for at least one finger based on the identified palm, identifies a gesture using the determined recognition points, converts the identified gesture into a data packet according to preset rules using OSC (Open Sound Control) protocol, transmits the converted data packet to the XR display unit, and the XR display unit outputs XR content using the received data packet.

In the gesture recognition system according to an embodiment of the present invention for solving the above problems, the processor identifies dynamic gestures from a plurality of gestures continuously identified within a preset time, stores the sequence of the identified dynamic gestures in memory, calculates a matching degree by comparing the stored sequence with predefined dynamic gesture patterns, converts commands corresponding to the dynamic gestures into data packets according to preset rules when the matching degree exceeds a threshold and transmits them to the XR display unit, and the XR display unit outputs continuous changes in XR content according to commands corresponding to the dynamic gestures.

In the gesture recognition system according to an embodiment of the present invention for solving the above problems, the processor identifies both-hand gestures through the image sensor, generates an expanded command set based on combinations of the identified both-hand gestures, and converts the generated command set into data packets according to preset rules using OSC protocol to transmit to the XR display unit.

In the gesture recognition system according to an embodiment of the present invention for solving the above problems, the processor, in response to selection of a user registration mode, collects information about hand size and joint positions from user hand images acquired through the image sensor, stores the collected information in memory together with user identification information corresponding to the hand images, in response to selection of a gesture registration mode, receives selection information for at least one of the user identification information stored in memory, acquires at least one gesture through the image sensor, receives command data corresponding to the acquired at least one gesture to generate a personalized gesture recognition model for the user according to the user identification information, and converts data about the generated gesture recognition model into data packets according to preset rules using OSC protocol to transmit to the XR display unit.

In the gesture recognition system according to an embodiment of the present invention for solving the above problems, the processor determines the user identification information corresponding to the identified gesture based on the size and speed of the identified gesture.

A gesture recognition method according to an embodiment of the present invention for solving the above problems includes: acquiring an image through an image sensor; identifying a palm from the acquired image; determining recognition points for at least one finger based on the identified palm; identifying a gesture using the determined recognition points; converting the identified gesture into a data packet according to preset rules using OSC (Open Sound Control) protocol; transmitting the converted data packet to an XR display unit; and outputting XR content using the received data packet at the XR display unit.

The gesture recognition method according to an embodiment of the present invention for solving the above problems includes: identifying dynamic gestures from a plurality of gestures continuously identified within a preset time; storing the sequence of the identified dynamic gestures in memory; calculating a matching degree by comparing the stored sequence with predefined dynamic gesture patterns; converting commands corresponding to the dynamic gestures into data packets according to preset rules and transmitting them to the XR display unit when the matching degree exceeds a threshold; and outputting continuous changes in XR content according to commands corresponding to the dynamic gestures at the XR display unit.

The gesture recognition method according to an embodiment of the present invention for solving the above problems includes: identifying both-hand gestures through the image sensor; generating an expanded command set based on combinations of the identified both-hand gestures; and converting the generated command set into data packets according to preset rules using OSC protocol to transmit to the XR display unit.

The gesture recognition method according to an embodiment of the present invention for solving the above problems includes: in response to selection of a user registration mode, collecting information about hand size and joint positions from user hand images acquired through the image sensor, and storing the collected information in memory together with user identification information corresponding to the hand images; in response to selection of a gesture registration mode, receiving selection information for at least one of the user identification information stored in memory, acquiring at least one gesture through the image sensor, and receiving command data corresponding to the acquired at least one gesture to generate a personalized gesture recognition model for the user according to the user identification information; and converting data about the generated gesture recognition model into data packets according to preset rules using OSC protocol to transmit to the XR display unit.

The gesture recognition method according to an embodiment of the present invention for solving the above problems further includes determining the user identification information corresponding to the identified gesture based on the size and speed of the identified gesture.

According to embodiments of the present invention, user gestures can be accurately recognized by detecting points of palms and fingers from images acquired from an image sensor, and specific functions can be output at an XR display unit according to recognized gestures.

According to embodiments of the present invention, user hand gestures can be accurately recognized using only RGB cameras without separate specialized sensors or equipment.

According to embodiments of the present invention, an interface that can be utilized in XR content production can be provided by distinguishing clearly recognizable finger shapes (VICTORY, Open, Close, Thumb up, etc.) among user gestures.

According to embodiments of the present invention, by transmitting recognized gesture information to an XR display unit using OSC (Open Sound Control) protocol, specific functions of XR content production solutions can be operated according to user gestures.

The effects of the present invention are not limited to the effects mentioned above, and other effects not mentioned will be clearly understood by those skilled in the art from the description of the claims.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
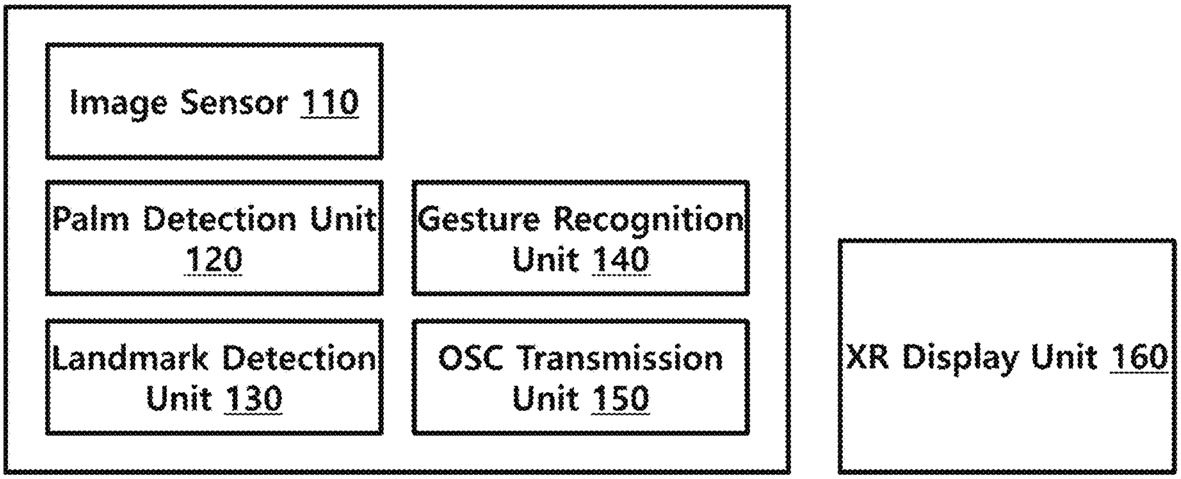
FIG. 1 is a block diagram showing the configuration of a gesture recognition system 100 according to an embodiment of the present invention.

Hereinafter, embodiments of the present invention will be described clearly and in detail with reference to the accompanying drawings so that those skilled in the art to which the present invention belongs can easily practice them.

The present invention may be implemented in various different forms and is not limited to the embodiments described herein. It is obvious that various modifications can be made within the scope without departing from the technical gist of the present invention. In describing the embodiments, descriptions of technical content that is widely known in the technical field to which the present invention belongs and is not directly related to the technical gist of the present invention will be omitted. The terms used in the embodiments are merely selected as appropriate terms for describing the embodiments, and the terms and expressions used in the claims are not limited by such descriptions. Therefore, it is obvious that they can be replaced with terms or expressions considered equivalent in the technical field to which the present invention belongs.

The embodiments described in this specification will be described with reference to cross-sectional views and/or plan views that are ideal exemplary diagrams of the present invention. In the drawings, the illustrated regions are expressed for effective description of technical content. Therefore, the regions illustrated in the drawings have schematic properties, and the shapes of the regions illustrated in the drawings are intended to exemplify specific forms of device regions and are not intended to limit the scope of the invention. In various embodiments of this specification, terms such as first, second, third, etc. are used to describe various components, but these components should not be limited by such terms. These terms are only used to distinguish one component from another. The embodiments described and illustrated herein may also include their complementary embodiments.

The terminology used in this specification is for describing embodiments and is not intended to limit the present invention. In this specification, singular forms also include plural forms unless specifically stated otherwise in the phrase. "Comprises" and/or "comprising" used in the specification do not exclude the presence or addition of one or more other components, steps, operations and/or elements in addition to the mentioned components, steps, operations and/or elements. Also, when a part is said to "include" a certain component, this means that it may further include other components rather than excluding other components unless specifically stated to the contrary.

Unless otherwise defined, all terms (including technical and scientific terms) used in this specification may be used with meanings that can be commonly understood by those having ordinary knowledge in the technical field to which the present invention belongs. Also, terms defined in commonly used dictionaries are not interpreted ideally or excessively unless explicitly specifically defined.

The present invention is not limited to the embodiments described below but may be implemented in various different forms. The present embodiments are merely examples of the content of the present invention, and are provided to inform those having ordinary knowledge in the technical field to which the present invention belongs of the scope of the invention in detail. The present invention is only defined by the scope of the claims. Throughout the specification, identical reference numerals refer to identical components.

Meanwhile, in the attached drawings, identical components may be represented by identical symbols. In the attached drawings, some components may be exaggerated, omitted, or schematically illustrated. This is to clearly explain the gist of the present invention by omitting unnecessary descriptions unrelated to the gist of the present invention.

Hereinafter, the concept of the present invention and embodiments thereof will be described in detail with reference to the drawings.

FIG. 1 is a block diagram showing the configuration of a gesture recognition system 100 according to an embodiment of the present invention.

Referring to FIG. 1, the gesture recognition system 100 according to an embodiment of the present invention may include an image sensor 110, a palm detection unit 120, a landmark detection unit 130, a gesture recognition unit 140, an OSC transmission unit 150, and an XR display unit 160. These components may be implemented as a combination of hardware devices, programmed microcontrollers, and application-specific integrated circuits (ASICs) to perform physical transformations and provide specific mechanical and electronic operations. For example, at least some of the palm detection unit 120, landmark detection unit 130, gesture recognition unit 140, and OSC transmission unit 150 are modules constituting one or more processors, and at least some of the data processed in each module may be processed by one or more processors. Also, data generated in each module may be stored in memory constituting the gesture recognition system 100 or in external memory.

The image sensor 110 may acquire images including user hand movements. The image sensor 110 is a silicon-based CMOS (Complementary Metal Oxide Semiconductor) sensor that can detect light coming through optical lenses and convert it into electrical signals. This electrical signal may be converted to digital data by an analog-to-digital converter (ADC) and transmitted to a processor. The image sensor 110 is equipped with specially designed infrared blocking filters and color filter arrays to capture accurate color information.

The palm detection unit 120 is implemented as a processor combined with a hardware accelerator to physically detect palms from images acquired through the image sensor 110. The palm detection unit 120 may process image data in byte units and store it in memory buffers, then quickly identify palms by applying hardware acceleration algorithms to the stored digital images. In this process, each pixel of the image data may be converted to preset voltage levels and processed through physical electronic circuits. The palm detection unit 120 may enhance processing efficiency by performing parallel processing through hardware such as FPGA (Field-Programmable Gate Array) or GPU (Graphics Processing Unit).

The landmark detection unit 130 is a hardware system based on digital signal processing (DSP) chips that can perform physical processing to find finger points from palms detected by the palm detection unit 120. The landmark detection unit 130 may load digital image data of palm regions from physical memory and transmit it to computational units. The computational units may extract feature points of images through preset matrix computation circuits and perform table lookup operations to calculate finger joint positions. Points of each finger are converted to three-dimensional spatial coordinates and stored in registers, and this data may be transmitted to subsequent processing stages through data buses.

The gesture recognition unit 140 may be implemented as a microprocessor combined with neural network accelerators. The gesture recognition unit 140 may physically recognize user gestures using finger recognition points identified by the landmark detection unit 130. According to various embodiments, the gesture recognition unit 140 may include dedicated hardware units for tensor operations. The gesture recognition unit 140 may perform rapid data processing by physically accelerating convolution and matrix multiplication operations of deep learning models through dedicated hardware units. The gesture recognition unit 140 may include power management circuits designed to operate at preset power states and may be implemented through adaptive performance control mechanisms that dynamically adjust clock frequencies according to recognition accuracy.

The OSC transmission unit 150 is composed of communication processors and physical network interfaces to transmit gestures recognized by the gesture recognition unit 140 to the XR display unit 160 using OSC (Open Sound Control) protocol. The OSC transmission unit 150 may convert recognized gesture data into electrical signals according to preset rules, store them in physical buffers, and then generate UDP (User Datagram Protocol) packets. The OSC transmission unit 150 may also include error detection and retransmission circuits to ensure transmission reliability and dedicated timer circuits to monitor network delays.

According to one embodiment, the XR display unit 160 may be directly linked with the OSC transmission unit 150 using OSC protocol. Through this, developers can utilize gesture data in real-time in XR content production environments and provide expanded usability compared to existing hand detection devices. To implement this function, the OSC transmission unit of the gesture recognition system 100 may generate message packets using OSC libraries based on UDP communication and transmit them to designated IP addresses and ports. OSC messages may include address patterns such as '/gesture/type', '/gesture/position', '/gesture/direction', each containing information about the type, position, and direction of recognized gestures. The XR display unit 160 may receive OSC messages and process them in real-time to immediately implement creation, transformation, and interaction of virtual objects according to gestures.

Figure 2:
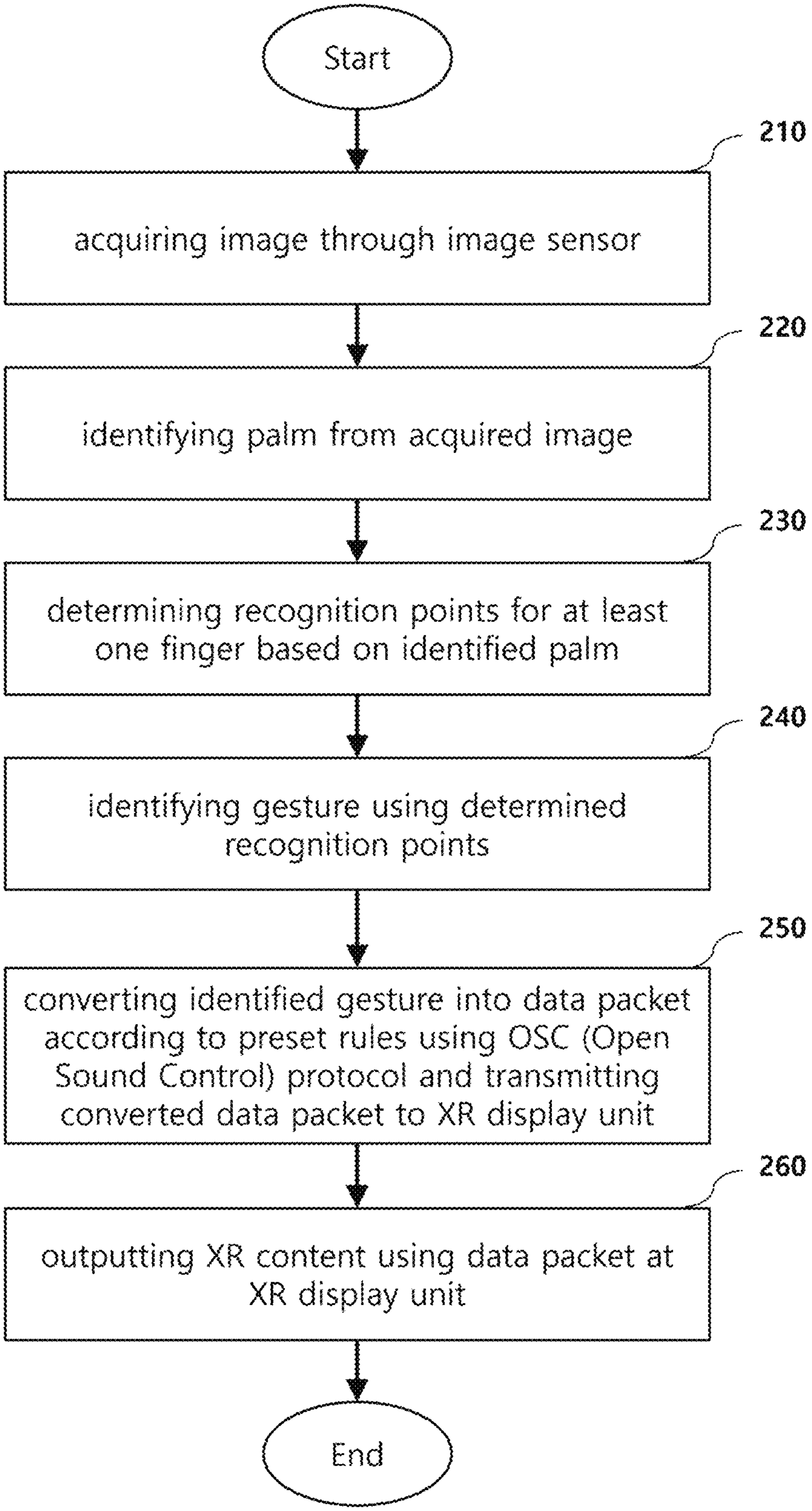
FIG. 2 is a flowchart showing a gesture recognition method according to an embodiment of the present invention.

FIG. 2 is a flowchart showing a gesture recognition method according to an embodiment of the present invention.

According to one embodiment, the gesture recognition method may include acquiring images through an image sensor, identifying palms from acquired images, determining recognition points for at least one finger based on identified palms, identifying gestures using determined recognition points, converting identified gestures into data packets according to preset rules using OSC (Open Sound Control) protocol, transmitting converted data packets to an XR display unit, and outputting XR content using data packets at the XR display unit.

According to one embodiment, the gesture recognition method may include step 210 of acquiring images through the image sensor 110. The image sensor 110 may acquire images at various frame rates from 30 frames per second to 240 frames per second, and each acquired frame may have a resolution of at least 1920×1080 pixels. Also, exposure time and ISO sensitivity may be automatically adjusted during image acquisition to secure consistent quality images even in various lighting environments.

According to one embodiment, the gesture recognition method may include step 220 of identifying palms from acquired images. In this step, operations may be performed to convert acquired RGB images to HSV (Hue, Saturation, Value) color space to separate skin color regions. In the skin color separation process, adaptive threshold setting algorithms may be used to increase detection accuracy for various skin tones. For example, contour extraction algorithms may be applied to separated skin color regions to identify candidate regions of hand shapes, and noise may be removed through operations. In detecting palms, convex hulls and convex defects of hand regions may be analyzed to confirm whether they are actual palm regions.

According to one embodiment, adaptive background subtraction techniques that help operate in various backgrounds and lighting environments may be additionally applied to the palm identification process. This technique may analyze consecutive frames of images to model backgrounds and separate moving objects (hands) from backgrounds. Also, partial object detection algorithms may be implemented to detect palms even when they are partially occluded, thereby improving detection reliability.

According to another embodiment, depth information may be utilized in the palm identification process. For example, depth sensors may be used together with RGB cameras to estimate depth information of hands, and then the estimated depth information may be used to more accurately separate palm regions from surrounding backgrounds.

The gesture recognition method may include step 230 of determining recognition points for at least one finger based on identified palms. In this step, deep learning-based hand pose estimation models such as Google's Mediapipe may be used to detect 21 major landmark points of hands. These 21 points may include palm centers, wrists, and joints and endpoints of each finger. The landmark detection model may utilize pre-trained convolutional neural networks (CNNs) to extract features at pixel level and identify three-dimensional coordinates of hand landmarks using extracted features.

According to one embodiment, the landmark detection process may include multiple hands detection functionality. In this case, up to 4 hands may be simultaneously detected and landmarks for each hand may be independently tracked. In multiple hands detection, unique identifiers may be assigned to each hand for continuous tracking, and the same identifiers may be maintained even when hands are occluded or disappear off-screen and reappear.

In another embodiment, hierarchical landmark detection methods may be applied to increase the accuracy of landmark detection. This method first detects palm regions and then sequentially detects finger joint points based on this, using position information of upper landmarks to increase detection accuracy of lower landmarks. In this process, anatomical constraints of hands may be applied to filter physically impossible finger poses.

The gesture recognition method may include step 240 of identifying gestures using determined recognition points. For example, the gesture recognition unit 140 may recognize gestures using identified finger points. In this step, finger point data received from the landmark detection unit 130 may be normalized and used to determine what gesture the current hand shape corresponds to. Gesture recognition may be performed by combining rule-based methods and machine learning-based methods. In rule-based methods, angles between fingers, relative positions of fingers to palms, extension/bending states of fingers, etc. may be calculated and compared with predefined gesture patterns. In machine learning-based methods, classification models (e.g., random forests, support vector machines, neural networks, etc.) that take landmark data as input may be used to recognize gestures.

For static gestures, recognition is possible with landmark data from a single frame, but for dynamic gestures, movement patterns of landmarks across multiple consecutive frames must be analyzed. For dynamic gesture recognition, LSTM (Long Short-Term Memory) or GRU (Gated Recurrent Unit) neural networks specialized for time series data analysis may be utilized to understand and classify hand movement patterns in temporal context.

According to one embodiment, fuzzy logic may be applied in the gesture recognition process to enhance robustness of recognition. Fuzzy logic calculates probabilities for each gesture class through continuous membership degrees rather than binary judgments, so it can effectively handle gestures in unclear intermediate states. Also, Bayesian inference may be applied to reflect gesture recognition results from previous frames in current frame recognition, thereby maintaining temporal consistency and deriving recognition results robust to noise.

According to another embodiment, the gesture recognition unit 140 may implement online learning mechanisms for personalization of gesture recognition. This method may collect recognition errors that occur while users use the system and gradually adjust gesture recognition models based on this. Separate model parameters may be maintained for each user to provide recognition performance optimized for each user's unique gesture performance style.

According to one embodiment, the gesture recognition method may include step 250 of converting identified gestures into data packets according to preset rules using OSC (Open Sound Control) protocol and transmitting converted data packets to an XR display unit. For example, the OSC transmission unit 150 may transmit recognized gestures to the XR display unit 160 using OSC protocol. For this, the OSC transmission unit 150 may convert recognized gesture information into OSC message format and transmit it to the XR display unit 160 through networks. OSC messages may include gesture types, confidence scores, hand positions and directions, and additional metadata.

When transmitting OSC messages, low-latency communication is ensured based on UDP (User Datagram Protocol), and important gesture events may be transmitted redundantly in preparation for message loss. Also, OSC bundles may be utilized to bundle multiple gesture information into one packet for transmission, thereby enhancing network efficiency.

According to one embodiment, the gesture recognition method may include step 260 where the XR display unit 160 outputs XR content using data packets at the XR display unit. Data packets transmitted through OSC protocol from the gesture recognition system 100 may be received and used to output XR content. The XR display unit 160 may include real-time rendering engines and OSC listener modules. Here, OSC listener modules may continuously monitor OSC messages coming through UDP ports (default 7000). Meanwhile, received OSC messages may be classified according to address patterns and transmitted to appropriate handler functions.

More specifically, messages with '/gesture/type' addresses may be transmitted to basic gesture processing handlers, messages with '/gesture/dynamic' addresses may be transmitted gesture processing handlers, and messages with '/gesture/two_hands' addresses may be transmitted to both-hand gesture processing handlers. Each handler may determine appropriate content reactions considering XR content states, currently activated interaction modes, and user contexts.

The XR display unit 160 provides real-time visual feedback for gesture inputs so users can intuitively confirm whether their gestures are correctly recognized. This may be implemented in the form of virtual representations of hand models, gesture recognition status icons, or physical effects (particles, light, sound, etc.) that respond to gestures.

XR content output from the XR display unit 160 may have various forms depending on gesture types and situations. For example, when a palm pushing motion (GESTURE_PALM_PUSH) is recognized, virtual menus or panels in front of users may be activated, and when a V-shape motion with fingers (GESTURE_VICTORY) is recognized, virtual objects may be selected and highlight effects may be applied. Hand opening motions (GESTURE_OPEN) may be mapped to menu expansion or object size increase, and hand closing motions (GESTURE_CLOSE) may be mapped to menu closing or object size decrease. When dynamic gestures or both-hand gestures are recognized, more complex animations or continuous changes may be applied to XR environments.

According to one embodiment, OSC message encryption and authentication mechanisms may be added to the gesture recognition system 100 to enhance security of gesture data. For example, TLS (Transport Layer Security) or DTLS (Datagram Transport Layer Security) may be applied to the gesture recognition system 100 to prevent unauthorized access and tampering of gesture data and protect user privacy.

According to one embodiment, the gesture recognition system 100 may identify dynamic gestures from multiple gestures continuously identified within preset times, store sequences of identified dynamic gestures in memory, calculate matching degrees by comparing stored sequences with predefined dynamic gesture patterns. When matching degrees exceed thresholds, commands corresponding to dynamic gestures may be converted into data packets according to preset rules and transmitted to the XR display unit 160, and the XR display unit 160 may output continuous changes in XR content according to commands corresponding to dynamic gestures. Through this functionality, users can perform more complex and intuitive interactions in XR environments.

Specifically, the gesture recognition system 100 may identify dynamic gestures from multiple gestures continuously identified within preset times, store sequences of identified dynamic gestures in memory, and calculate matching degrees by comparing stored sequences with predefined dynamic gesture patterns. In this process, the system may store gesture recognition results from the recent 3 seconds in buffers in chronological order, and these buffers may be updated in sliding window fashion. Stored sequences may be compared with predefined dynamic gesture pattern libraries through DTW (Dynamic Time Warping) algorithms considering temporal features. Similarity scores (matching degrees) with each pattern are calculated, and these scores may be normalized to values between 0 and 1.

When matching degrees exceed thresholds (default 0.75), the gesture recognition system 100 may convert commands corresponding to dynamic gestures into data packets according to preset rules and transmit them to the XR display unit 160. Data packets use OSC address patterns (/gesture/dynamic) and may include types of recognized dynamic gestures, start and end times, and matching reliability. The XR display unit 160 may output continuous changes in XR content according to commands corresponding to dynamic gestures. For example, when circular drawing dynamic gestures are recognized, the XR display unit 160 may continuously output animations rotating virtual objects, and when left-right swipe gestures are recognized, continuous changes switching pages or menus in XR environments may be output. Dynamic gestures may include not only more than 20 basic patterns predefined in the system but also custom patterns directly registered by users.

Figure 3:
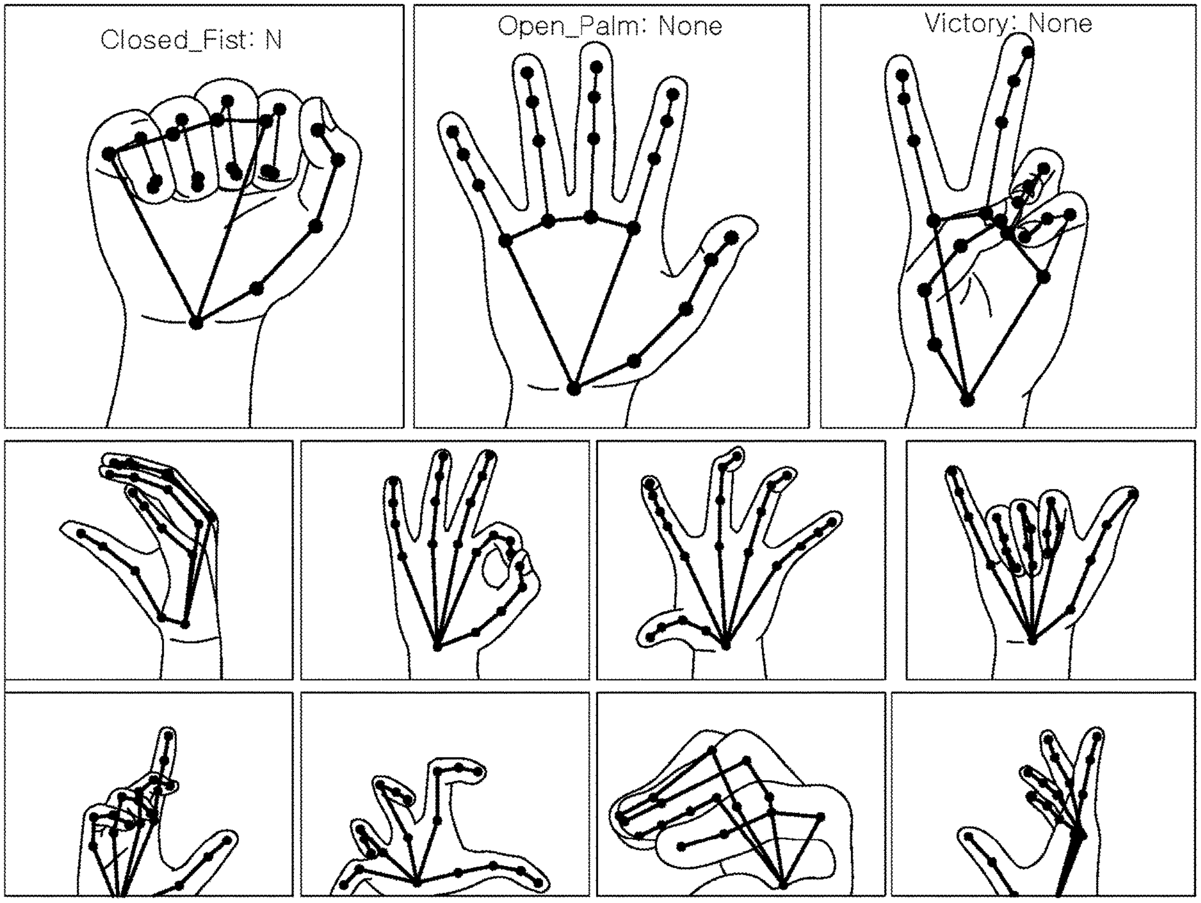
FIG. 3 is a diagram showing various gesture types according to an embodiment of the present invention.

FIG. 3 is a diagram showing various gesture types according to an embodiment of the present invention.

According to one embodiment, the gesture recognition unit 140 may recognize multiple specialized gestures based on various combinations of fingers and hand directions. These gestures may include no hand motion (GESTURE_NONE), first down motion (GESTURE_FIST_DOWN), index finger pointing right (GESTURE_INDEX_FINGER_RIGHT), index finger pointing left (GESTURE_INDEX_FINGER_LEFT), palm pushing motion (GESTURE_PALM_PUSH), finger up motion (GESTURE_FINGER_UP), V-shape motion with fingers (GESTURE_VICTORY), hand opening motion (GESTURE_OPEN), hand closing motion (GESTURE_CLOSE), and thumb up motion (GESTURE_THUMB_UP).

According to various embodiments, the gesture recognition unit 140 may learn predefined gesture patterns to interpret various user intentions. As a specific implementation method, each gesture may be defined as feature vectors of relative positions and angles between finger joints, and these may be input into multi-layer perceptron (MLP) neural networks for classification. For this, the gesture recognition system 100 may train models using at least hundreds of training samples for each gesture and secure invariant characteristics to hand size and rotation through normalization processes of finger joint coordinates. Angles between fingers and relative distances may be calculated to extract unique features for each gesture, and based on this, each gesture may be classified with accuracy of 95% or higher.

According to one embodiment, the gesture recognition unit 140 may focus on recognizing gestures such as V-shape motion with fingers (GESTURE_VICTORY), hand opening motion (GESTURE_OPEN), hand closing motion (GESTURE_CLOSE), and thumb up motion (GESTURE_THUMB_UP) that can be clearly recognized among various gestures. These gestures may have higher recognition accuracy because finger point arrangements are distinctly distinguished compared to other gestures.

According to one embodiment, the gesture recognition system 100 may identify both-hand gestures through image sensors, generate expanded command sets based on combinations of identified both-hand gestures, and convert generated command sets into data packets according to preset rules using OSC protocol to transmit to the XR display unit 160. This functionality enables complex interactions, for example, enabling composite tasks such as selecting virtual objects with one hand and manipulating those objects with the other hand.

As a specific implementation method, the gesture recognition system 100 may simultaneously detect two hands in images received through the image sensor 110 and track each independently. Each hand may be distinguished as left or right by analyzing palm directions, and when necessary, wrist directions may be tracked to increase accuracy of left-right distinction. When both-hand gestures are recognized, these may be combined to generate expanded command sets. For example, when the left hand is in hand opening motion (GESTURE_OPEN) state and the right hand performs index finger pointing right (GESTURE_INDEX_FINGER_RIGHT), this may be interpreted as 'object selection and movement' command, and when the left hand is in first down motion (GESTURE_FIST_DOWN) state and the right hand performs V-shape motion with fingers (GESTURE_VICTORY), this may be interpreted as 'object duplication' command. In the both-hand gesture identification process, the gesture recognition system 100 may simultaneously detect up to 4 hands and distinguish left and right hands based on unique identifiers, relative positions, skin colors, and temporal consistency of each hand.

Expanded command sets based on both-hand gesture combinations may be defined through two-hand combination matrices. This matrix is 10×10 in size and may define commands for all possible combinations (total 100) of 10 basic gestures of the left hand and 10 basic gestures of the right hand. Also, relative distance changes between both hands may be interpreted as 'zoom in/out' commands, and rotation angle changes of both hands may be interpreted as 'rotation' commands.

Generated expanded command sets may be converted into data packets using OSC protocol. Both-hand gesture commands use preset address patterns (e.g., /gesture/two_hands) and may include information such as gesture types of each hand, relative positions, distance change rates, rotation angles, etc. Converted data packets are transmitted to the XR display unit 160 based on UDP and may be utilized in XR applications requiring complex interactions such as 3D modeling, virtual assembly, digital instrument playing, etc.

Figure 4:
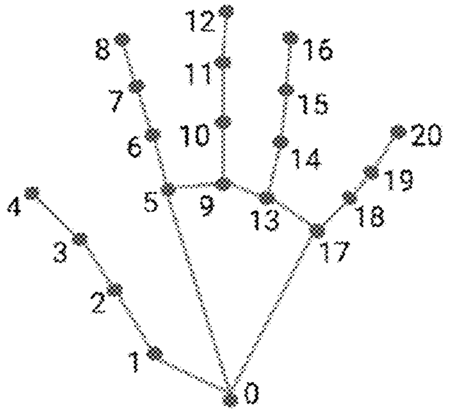
FIG. 4 is a diagram showing landmark detection results according to an embodiment of the present invention.
Figure 4:
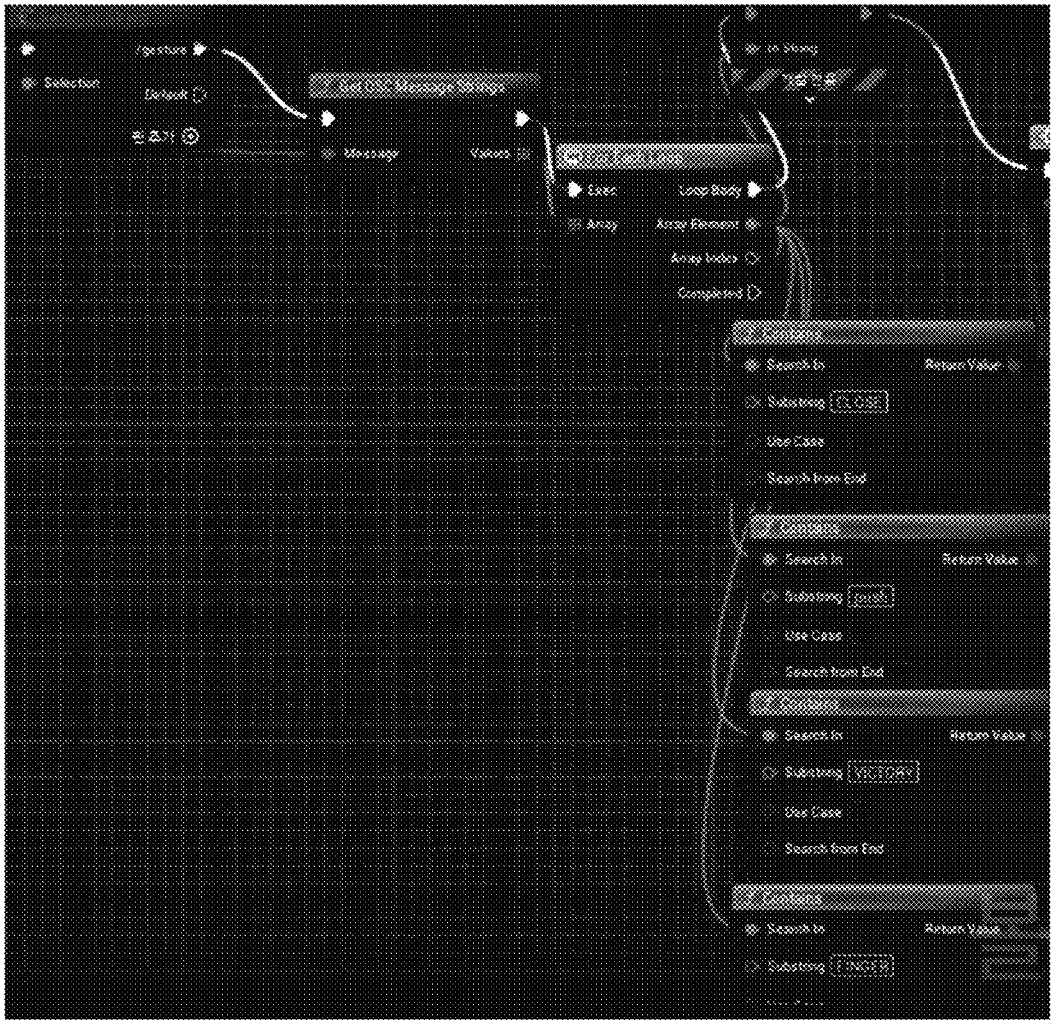

FIG. 4 is a diagram showing landmark detection results according to an embodiment of the present invention.

According to one embodiment, the landmark detection unit 130 may find various finger points from palms. Referring to FIG. 4, a total of 21 key landmark points may be identified in palm regions. These points form skeletal structures of hands, enabling accurate understanding of current hand shapes.

The 21 landmark points identified by the landmark detection unit 130 may be indexed with specific numbers. Based on point 0 located at the wrist, at least 4 points may be allocated for each finger. Specifically, thumbs may consist of points 1 to 4, index fingers may consist of points 5 to 8, middle fingers may consist of points 9 to 12, ring fingers may consist of points 13 to 16, and little fingers may consist of points 17 to 20. For each finger, lower numbers may start from joints close to palms and increase toward fingertips.

In one embodiment, these landmark points are expressed as three-dimensional spatial coordinates (x, y, z), where x and y represent two-dimensional coordinates on screens and z represents relative depth from cameras. These three-dimensional coordinates are normalized to values between 0 and 1, providing consistent coordinate values in input images of various resolutions. In FIG. 4, each landmark point is displayed as a small circle, and lines connecting these points may visualize skeletal structures of hands.

In additional embodiments, the landmark detection unit 130 may provide rotation information of each joint beyond simple position information. This rotation information is expressed as quaternions or Euler angles, enabling understanding of exact directions and bending degrees of fingers. Rotation information may be visualized as small coordinate axes at each joint point, for example, red, green, and blue lines representing directions of x, y, and z axes respectively.

In another embodiment, the landmark detection unit 130 may provide detection confidence scores for each landmark point. These confidence scores are values between 0 and 1, indicating how accurately corresponding points are detected. Confidence scores may be expressed as color densities at each landmark point. Brighter colors may indicate higher confidence. Points with low confidence scores may correspond to cases where exact positions are uncertain due to occlusion or image quality degradation.

In one embodiment, filtering processing may be applied so that landmark detection results maintain temporal consistency. Original detection results may be displayed as dotted lines and filtered results may be displayed as solid lines together, enabling visual confirmation of how hand trembling or detection noise is mitigated by filtering. Such temporal filtering may be implemented through algorithms such as Kalman filters or one-euro filters.

According to one embodiment, the gesture recognition system 100 may, in response to selection of user registration mode, collect information about hand size and joint positions from user hand images acquired through image sensors, and store collected information in memory together with user identification information corresponding to hand images. Also, the gesture recognition system 100 may, in response to selection of gesture registration mode, receive selection information for at least one of user identification information stored in memory, acquire at least one gesture through image sensors, receive command data corresponding to acquired at least one gesture to generate personalized gesture recognition models for users according to user identification information. The gesture recognition system 100 may convert data about generated gesture recognition models into data packets according to preset rules using OSC protocol to transmit to XR display units.

As a specific implementation method, when users first use the system, calibration processes may be performed where 10 basic gestures are performed 5 times each. Based on data collected in this process, parameter sets (finger length ratios, joint flexibility coefficients, performance patterns for each gesture) may be generated to model user hand characteristics. These parameter sets are stored in JSON format and connected to user IDs, and corresponding profiles may be loaded and applied to base models whenever users access the system. The gesture recognition system 100 may apply online learning algorithms that analyze recognition errors and success cases occurring during continuous use to fine-tune parameters, thereby gradually improving user-specific recognition accuracy over time.

Furthermore, the gesture recognition system 100 of the present invention may determine user identification information corresponding to identified gestures based on sizes and speeds of identified gestures. This considers that even the same gesture may be performed differently by each user, and size and speed patterns of gestures may be utilized as important biometric identification elements. For example, the gesture recognition system 100 may measure hand acceleration, angular velocity, and time required to complete gestures during gesture performance. These measured values are normalized and converted to feature vectors, and these feature vectors may be input to user classifiers to identify users currently performing gestures. Through this functionality, personalized gesture recognition becomes possible without additional authentication procedures.

As such, the gesture recognition method of the present invention may be expanded and optimized through various embodiments as well as basic embodiments, thereby providing more accurate and robust gesture recognition and interaction experiences. The gesture recognition system 100 may utilize AI functions to accurately recognize user hand gestures and transmit recognized gestures to the XR display unit 160 through OSC protocol, enabling users to control XR content through natural gestures. Through this, users can enjoy intuitive and immersive XR experiences without separate controllers.

Meanwhile, the following embodiments may also be implemented through the gesture recognition system 100.

According to one embodiment, the gesture recognition system 100 may, in response to selection of user registration mode, collect information about hand size and joint positions from user hand images acquired through image sensors, and store collected information in memory together with user identification information corresponding to hand images. User registration mode may be activated through system setting menus or voice commands, and when activated, users are requested to present hands at various angles and poses according to on-screen guidance.

Information about hand size and joint positions collected may include relative distance ratios between 21 landmark points, ranges of joint bending angles, finger length ratios, etc. This information quantifies anatomical characteristics of hands that differ for each user and is defined as hand profiles. Collected hand profiles may be stored in memory together with user identification information (names, IDs, or face recognition results). Storage format uses JSON structures, and independent profile files may be created for each user.

In response to selection of gesture registration mode, the gesture recognition system 100 may receive selection information for at least one of user identification information stored in memory, acquire at least one gesture through image sensors, and receive command data corresponding to acquired at least one gesture to generate personalized gesture recognition models for users according to user identification information. Gesture registration processes proceed in three stages: first, users may define names of gestures to register and commands to connect. Second, according to system guidance, the same gesture may be repeatedly performed more than 10 times at various angles and speeds. Third, collected gesture data is automatically preprocessed and converted to feature vectors, and more than 50 variant samples may be generated through data augmentation techniques.

Personalized gesture recognition models generated this way use multi-layer perceptron (MLP) neural network structures and may consist of input layers (3D coordinates and metadata of 21 landmarks), 2 hidden layers (128 and 64 neurons each), and output layers (registered gesture classes). Models are learned through backpropagation algorithms, and overfitting may be prevented through cross-validation.

Data about generated gesture recognition models may be converted into data packets according to preset rules using OSC protocol and transmitted to XR display units. Data packets use preset address patterns (e.g., /gesture/custom_model) and may include user IDs, model versions, lists of registered gestures, and command information connected to each gesture. XR display units may receive this information to recognize corresponding users' custom gestures and generate appropriate XR content reactions.

According to one embodiment, the gesture recognition system 100 may determine user identification information corresponding to identified gestures based on sizes and speeds of identified gestures. This considers that even the same gesture may be performed differently by each user and is a function applying biometric recognition principles to gesture recognition. The gesture recognition system 100 may measure gesture sizes (hand extension degrees, distances between fingers), speeds (acceleration and angular velocity of joint movements), time required to complete gestures, and flexibility patterns of finger joints.

These measured values may be converted to multi-dimensional feature vectors and input to pre-learned user classifiers. Classifiers are based on support vector machine (SVM) algorithms and may be learned with user profile data stored in memory. Classification results are output as probability distributions for each user, and users with highest probabilities may be identified as users who performed current gestures. Results are confirmed only when identification result reliability is above thresholds (0.7), otherwise they may be classified as 'unidentified users'.

This user identification functionality may be utilized to automatically apply personalized gesture models for each user in multi-user environments or for authority-based XR content access control. Also, it may be used to load user-specific settings or progress states without additional authentication procedures, thereby improving user experiences.

Meanwhile, all components constituting embodiments of the present invention have been described as being combined into one or operating in combination, but the present invention is not necessarily limited to such embodiments. That is, within the scope of the purpose of the present invention, all components may selectively combine into one or more to operate. Also, while all components may each be implemented as one independent hardware, some or all of each component may be selectively combined and implemented as computer programs having program modules that perform some or all combined functions in one or multiple hardware. Codes and code segments constituting such computer programs may be easily inferred by those skilled in the technical field of the present invention. Such computer programs may be stored in non-transitory computer readable media and read and executed by computers to implement embodiments of the present invention.

Here, non-transitory readable recording media may mean media that store data semi-permanently and are readable by devices, rather than media that store data for short moments such as registers, caches, memory, etc. Specifically, the above-mentioned programs may be stored and provided in non-transitory readable recording media such as CDs, DVDs, hard disks, Blu-ray disks, USBs, memory cards, ROMs, etc.

While preferred embodiments of the present invention have been shown and described above, the present invention is not limited to the specific embodiments described above, and various modifications may be made by those having ordinary knowledge in the technical field to which the invention belongs without departing from the gist of the present invention claimed in the claims. Such modifications should not be understood individually from the technical ideas or prospects of the present invention.

What is claimed is:

1. A gesture recognition system using an AI function, comprising: an image sensor; a memory; a processor; and an XR display unit,
- wherein the processor:
  - identifies a palm from an image acquired through the image sensor,
  - determines recognition points for at least one finger based on the identified palm,
  - identifies a gesture using the determined recognition points,
  - converts the identified gesture into a data packet according to preset rules using an OSC (Open Sound Control) protocol,
  - transmits the converted data packet to the XR display unit,
  - the XR display unit outputs XR content using the received data packet, and
- wherein the processor:
  - in response to a selection of a user registration mode, collects information about hand size and joint positions from user hand images acquired through the image sensor, and stores the collected information in the memory together with user identification information corresponding to the hand images,
  - in response to a selection of a gesture registration mode, receiving selection information for at least one of the user identification information stored in the memory, acquires at least one gesture through the image sensor, and receives command data corresponding to the acquired at least one gesture to generate a personalized gesture recognition model for the user according to the user identification information, and
  - converts data about the generated gesture recognition model into data packets according to preset rules using the OSC protocol to transmit to the XR display unit.

2. The system of claim 1, wherein the processor:
- identifies dynamic gestures from a plurality of gestures continuously identified within a preset time,
- stores sequences of the identified dynamic gestures in the memory,
- calculates matching degrees by comparing the stored sequences with predefined dynamic gesture patterns,
- converts commands corresponding to the dynamic gestures into data packets according to the preset rules and transmits them to the XR display unit when the matching degrees exceed a threshold, and
- the XR display unit outputs continuous changes in XR content according to commands corresponding to the dynamic gestures.

3. The system of claim 1, wherein the processor:
- identifies both-hand gestures through the image sensor,
- generates expanded command sets based on combinations of the identified both-hand gestures, and
- converts the generated command sets into data packets according to preset rules using OSC protocol to transmit to the XR display unit.

4. The system of claim 1, wherein the processor determines the user identification information corresponding to the identified gesture based on size and speed of the identified gesture.

5. A gesture recognition method using an AI function, comprising:
- acquiring an image through an image sensor;
- identifying a palm from the acquired image;
- determining recognition points for at least one finger based on the identified palm;
- identifying a gesture using the determined recognition points;
- converting the identified gesture into a data packet according to preset rules using an OSC (Open Sound Control) protocol;
- transmitting the converted data packet to an XR display unit;
- outputting XR content using the received data packet at the XR display unit;
- in response to a selection of a user registration mode, collecting information about hand size and joint positions from user hand images acquired through the image sensor, and storing the collected information in memory together with user identification information corresponding to the hand images;
- in response to a selection of a gesture registration mode, receiving selection information for at least one of the user identification information stored in the memory, acquiring at least one gesture through the image sensor, and receiving command data corresponding to the acquired at least one gesture to generate a personalized gesture recognition model for the user according to the user identification information; and
- converting data about the generated gesture recognition model into data packets according to preset rules using the OSC protocol to transmit to the XR display unit.

6. The method of claim 5, further comprising:
- identifying dynamic gestures from a plurality of gestures continuously identified within a preset time;

storing sequences of the identified dynamic gestures in memory;
calculating matching degrees by comparing the stored sequences with predefined dynamic gesture patterns;
converting commands corresponding to the dynamic gestures into data packets according to the preset rules and transmitting them to the XR display unit when the matching degrees exceed a threshold; and
outputting continuous changes in XR content according to commands corresponding to the dynamic gestures at the XR display unit.

7. The method of claim 5, further comprising:
identifying both-hand gestures through the image sensor;
generating expanded command sets based on combinations of the identified both-hand gestures; and
converting the generated command sets into data packets according to preset rules using OSC protocol to transmit to the XR display unit.

8. The method of claim 5, further comprising determining the user identification information corresponding to the identified gesture based on size and speed of the identified gesture.

* * * * *